Figure 1:
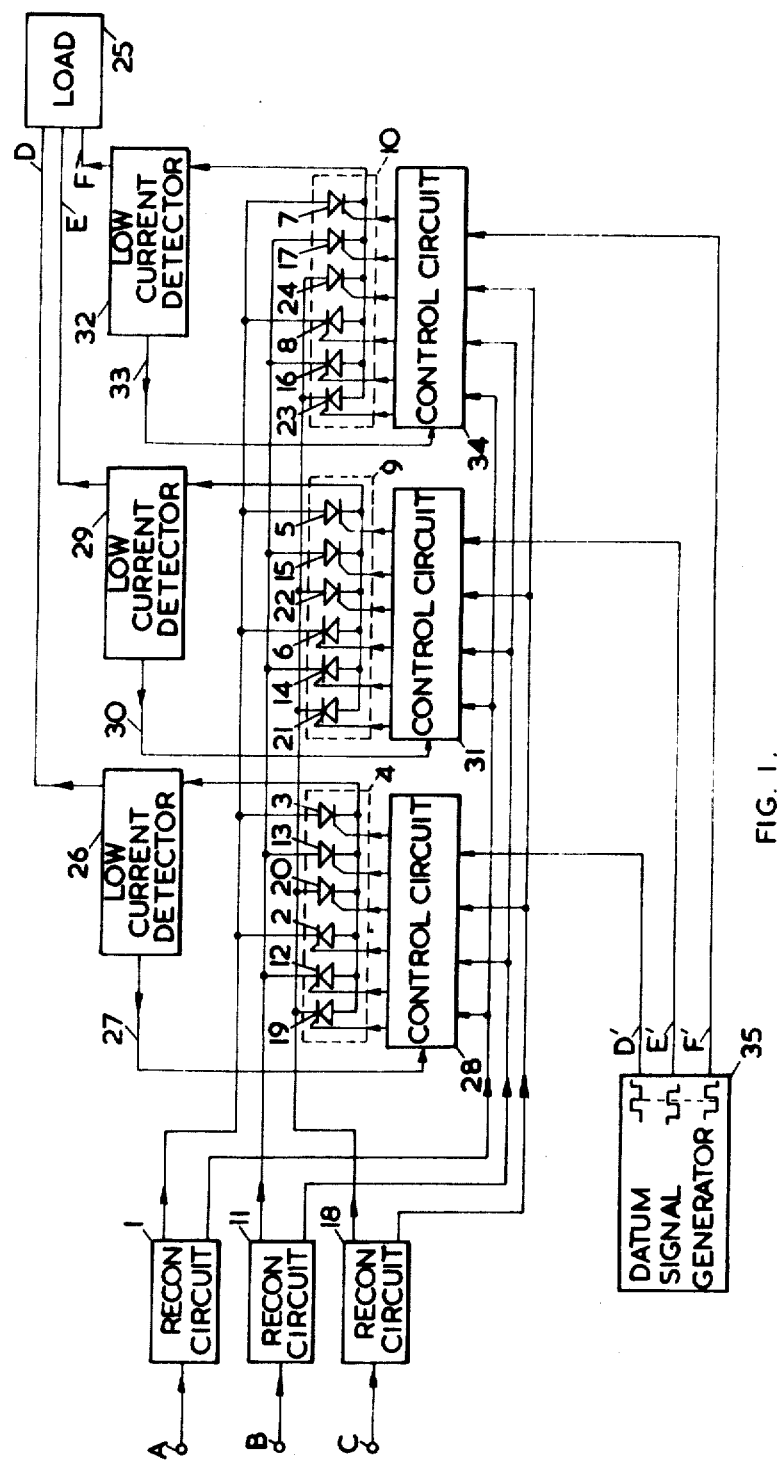

United States Patent

Splatt

[15] 3,678,369
[45] July 18, 1972

[54] CYCLOCONVERTERS

[72] Inventor: Reginald John Kingston Splatt, Farnham, England

[73] Assignee: Minister of Technology in Her Britannic Majesty's Government of the United Kingdom of Great Britain and Northern Ireland, London, England

[22] Filed: Oct. 21, 1970

[21] Appl. No.: 82,779

[30] Foreign Application Priority Data

Oct. 24, 1969 Great Britain ..................... 52,193/69

[52] U.S. Cl. ........................................................ 321/69 R
[51] Int. Cl. ................................................. H02m 5/30
[58] Field of Search ........................... 321/5, 60, 69 R

[56] References Cited

UNITED STATES PATENTS

| | | | |
|---|---|---|---|
| 3,400,321 | 9/1968 | Lafuze | 321/60 |
| 3,419,785 | 12/1968 | Lafuze | 321/5 X |
| 3,585,485 | 6/1971 | Gyugyi et al. | 321/69 R |
| 3,585,486 | 6/1971 | Gyugyi et al. | 321/69 R |
| 3,609,509 | 9/1971 | Lafuze | 321/5 X |

Primary Examiner—William M. Shoop, Jr.
Attorney—Hall, Pollock & Vande Sande

[57] ABSTRACT

A cycloconverter with a supply voltage reference signal generator, a datum signal generator, and variable period timing circuits each triggered by an output of the reference signal generator and each operating for a period determined by an output of the datum signal generator. Trigger circuits are controlled by the timing circuits and controlled rectifiers, rendered conductive by trigger signals from the trigger circuits, transmit power from an AC supply to one or more output lines to form a supply at another frequency. Low current detectors in each output line and gating circuits responsive to an output of the datum signal generator and one of the low current detectors ensure that the trigger signals are not applied to any of the rectifiers when the current flowing in the output line supplied by them is less than a predetermined value or of the opposite polarity to the current which they are connected to conduct.

7 Claims, 5 Drawing Figures

CYCLOCONVERTERS

The present invention relates to cycloconverters and similar electrical power conversion apparatus.

Cycloconverters have many uses in the control and conversion of electrical power supplies. In general they accept an alternating current power at one frequency and convert it to provide a power output at another frequency. For example in the control of traction equipment a cycloconvertor may have a three phase 400 Hz input supply and may produce an output at a frequency which varies between ¼ Hz and 100 Hz. Alternatively in an aircraft application a cycloconvertor may be arranged to have a variable frequency supply and to produce a fixed frequency output. Aircraft alternating current supplies derived from engine driven generators often vary over a 2 to 1 range in frequency and some form of control is necessary to reduce this frequency variation.

Known cycloconverters generally employ control circuits wherein filtered samples of the alternating supply waveforms superimposed on suitable direct bias voltages are applied to the control electrodes of thyristors or mercury arc rectifiers. When the instantaneous value of the combined voltages reaches a critical level, characteristic of the type of controlled rectifier employed, the controlled rectifier becomes conductive. Such circuits are undesirably sensitive to changes in their power supply voltages, and to temperature effects which cause changes in the characteristics of the controlled rectifiers or other components.

It is an object of the present invention to provide pulse timing circuits for controlling the firing of thyristors or other controllable rectifiers in a cycloconvertor.

The thyristors or controllable rectifiers in a cycloconverter are triggered at predetermined times after their supply voltage waveform has crossed its mean voltage level or some other reference level. The point at which the waveform crosses its mean voltage level provides a datum time against which the timing of the trigger point is determined. One of the difficulties is that when a thyristor is fired, the resulting sudden change in the current drawn from the supply causes a transient voltage which distorts the supply voltage waveform, and the triggering circuits may respond to the transient voltage by generating an unwanted firing pulse. The circuits which derive thyristor trigger pulses from the supply voltage should therefore be supplied with a relatively pure form of the supply waveform, to avoid the generation of unwanted firing pulses due to transients or noise components on the supply waveform. The magnitude of the transient voltages will depend on the source impedance of the supply. In the case of a multi-phase supply transients developed on one phase supply line are inductively coupled into the other phase supply lines through the windings of the supply transformer or alternator. It is difficult to remove these transients by conventional filters without also producing unacceptable phase shifts, and it is another object of the present invention to provide other means for obtaining a comparatively transient-free form of the supply voltage waveform for use in the thyristor control circuits.

According to the present invention there is provided a cycloconvertor for transforming electrical power from an alternating current supply to another frequency, including input reference means for deriving at least one supply voltage reference output representative of a waveform of the said alternating current supply, datum signal means for providing at least one periodic datum signal having the said other frequency, a plurality of variable period timing circuits each having a triggering input connection connected to an output of the said input reference means, and a period-controlling input connection connected to an output of the said datum signal supply means, a plurality of trigger circuits each connected to respond to resetting actions of a separate one of the variable period timing circuits by generating trigger signals for each resetting action thereof, and a plurality of controllable rectifiers each connected to receive trigger signals from a separate one of the trigger circuits and to transmit power from the said alternating current supply when rendered conductive by the said trigger signals. The controlled rectifiers will generally comprise some rectifiers hereinafter called positively connected rectifiers, which are connected to conduct conventional direct current from the supply to the output, and some rectifiers, hereinafter called negatively connected rectifiers, which are connected to conduct conventional direct current from the output to the supply. The cycloconvertor may be required to provide a single-phase output on one output line, or an output of several phases on separate output lines each fed by a separate set of the controllable rectifiers. It will preferably include a separate low current detector coupled to each of the output lines, and a plurality of gate circuits each responsive to one of the datum signals and one of the low current detectors, for preventing the application of trigger signals to any subset of the controlled rectifiers when the current flowing in the output line supplied by them is less than a predetermined value, or of the opposite polarity to the current which they are connected to conduct.

The input reference means may include a reconstitution circuit including a current transformer constructed to be comparatively sensitive to transients having periods considerably shorter than a half cycle of the supply frequency, having a primary winding connected in series with a supply line of the cycloconverter, and a secondary winding connected at one end to the supply line so as to derive a supply voltage reference output by an additive combination of the supply voltage with transient voltages induced in the secondary winding.

In some applications, it may be desirable to have a facility for varying the output frequency without causing excessive variations in its waveform or harmonic content. This requires a datum signal of controllable frequency whose waveform remains substantially the same shape throughout its frequency range. It is convenient to satisfy this requirement by making the datum signal serasoidal, that is to say having a triangular waveform in which the increasing sections and the decreasing sections have the same rate of change. A serasoidal signal may be provided by an integrating amplifier circuit connected to receive a square wave input at the desired frequency. However, any periodic waveform generally similar to the required output waveform, for instance a sinusoidal waveform, may be used as the datum signal. Where an output of two or more phases is required, a corresponding number of datum signals may be provided, having a phase relationship as required of the desired outputs.

The output waveform of a cycloconverter may be considered as the cumulative result of transmitting selected portions of the input power supply voltage waveforms, each portion being selected by firing an appropriate controlled rectifier at a predetermined time. The form of the output will depend on which portions of the input waveforms are selected and the number of consecutive portions selected in each half cycle of the output. If for example a given portion of each selected input supply voltage cycle is used than the output will approach a square wave in form and consequently will include a considerable proportion of harmonics. These harmonics represent wasted power and it is desirable to reduce them to as low a level as practicable. In many applications filtering of the output waveform is necessary and obviously the higher the power content of the harmonics the heavier and more substantial the filter components must be. Because of the size and weight limitations imposed on aircraft installations for example it is particularly desirable to keep the harmonic power content in airborne cycloconverter outputs as low as practicable.

In the cycloconverters of the kind herein described the precise control of the thyristor firing angles achieved by the use of pulse timing circuits enables each thyristor to be fired at a different time in each cycle of a sequence of cycles of the input power supply; and the output waveform can thereby be made up of suitable portions of the input power supply cycles to produce an output of substantially sinusoidal form having a comparatively low portion of harmonics.

The precise control of the firing times is also facilitated by the provision of relatively ideal, comparatively transient-free versions of the supply waveforms to the control circuits. In the present cycloconverter this is achieved by means of the reconstitution circuits. As mentioned hereinbefore, transients in the supply waveform are produced when a thyristor is fired. Each transient takes the form of a sudden voltage reduction or discontinuity in the waveform together with a high frequency "spike." The reconstitution circuit produces a voltage proportional to the current transients, and adds it to a voltage derived directly from the supply to produce a reconstituted or "patched up" voltage waveform which is comparatively free of distortion.

Figure 2:
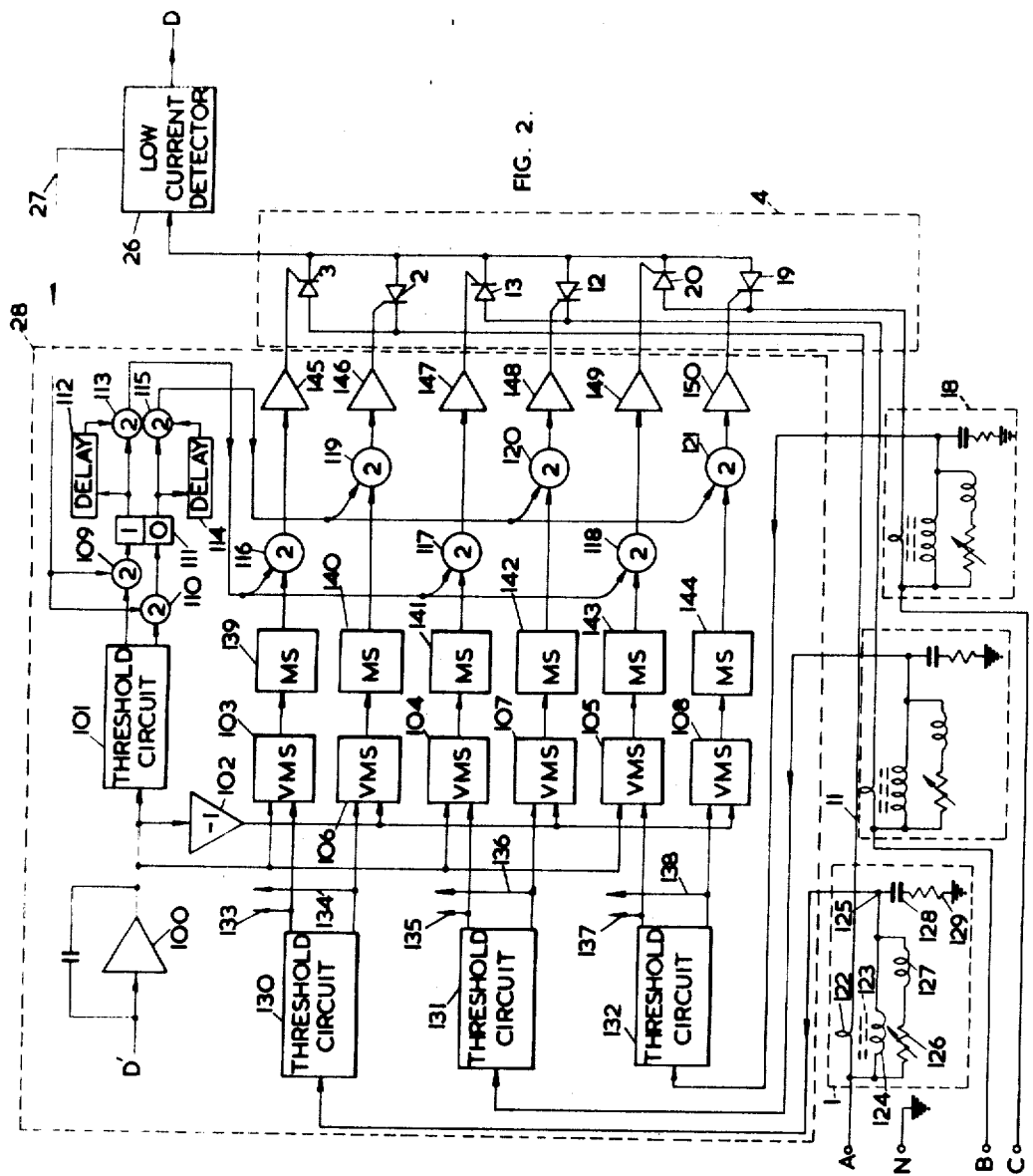
Figure 3:
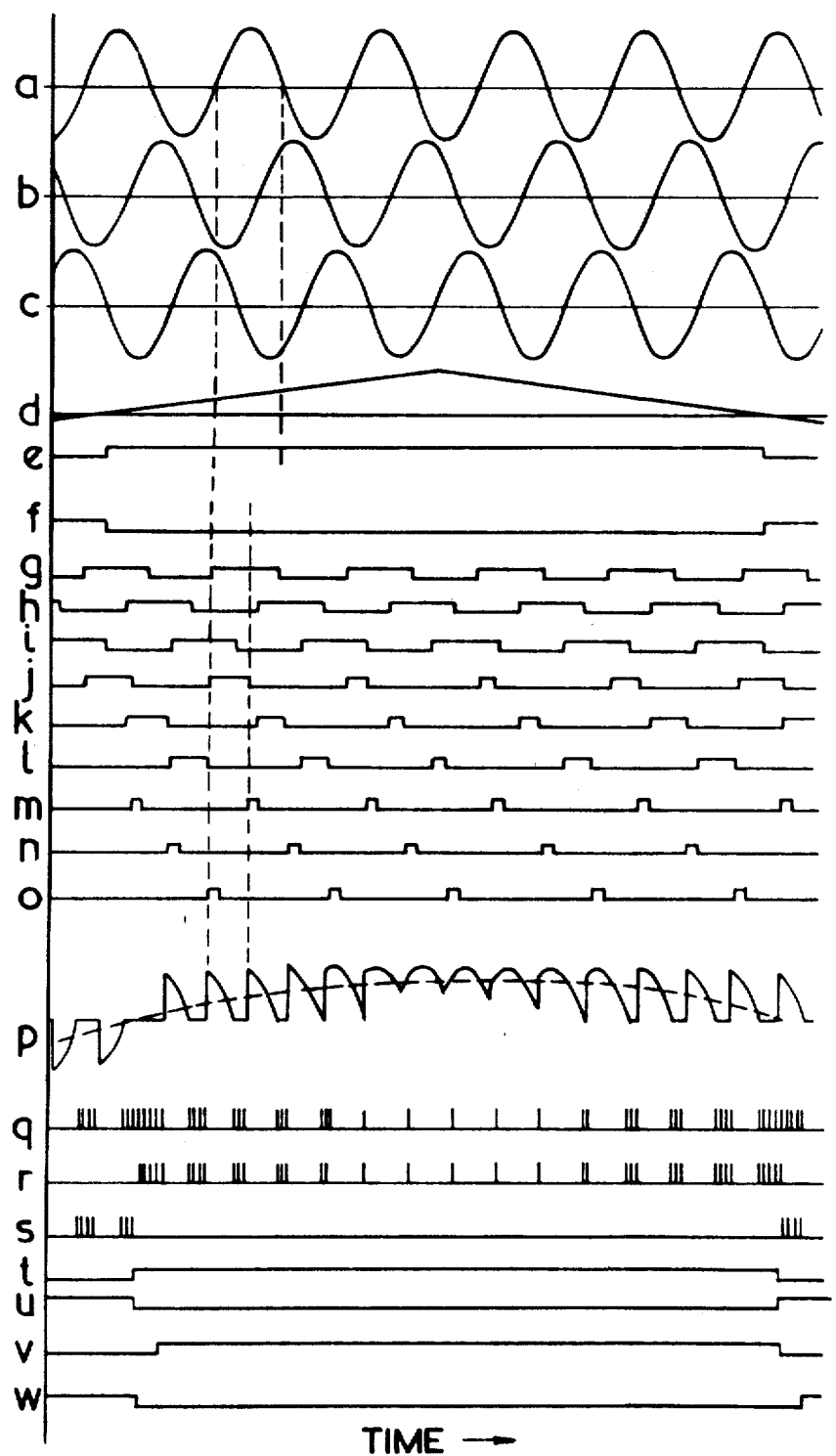
Figure 4:
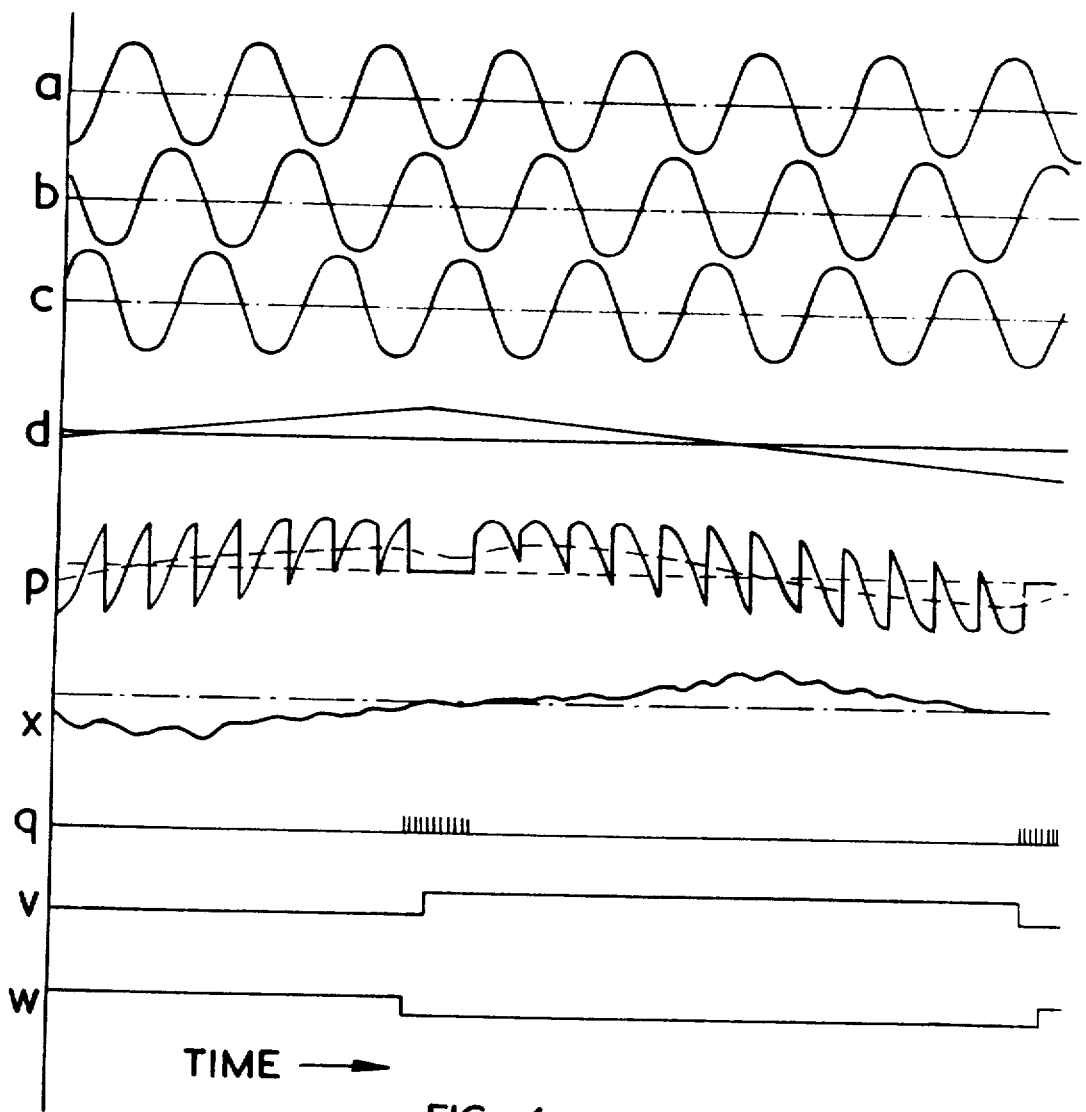
Figure 5:
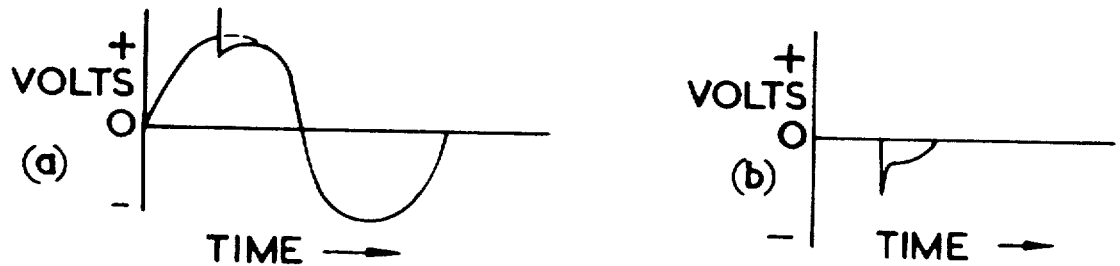

The method of controlling the firing by thyristors by pulse timing circuits and logic gate circuits lends itself to the repeated use of a few basic circuits. It is therefore particularly adapted to the use of integrated circuits with consequent savings in space, weight and power consumption In order that the invention may be more easily understood, an embodiment thereof will now be described with reference to the accompanying drawings of which:

FIG. 1 is a block circuit diagram showing the general arrangement of a cycloconvertor having a three phase input and a three phase output, FIG. 2 is a diagram showing in more detail some of the blocks of FIG. 1, FIG. 3 is a graphical representation of various waveforms occuring in the cycloconverter of FIGS. 1 and 2 when it is supplying current to a resistive load, FIG. 4 is a qualitative graphical representation of various typical waveforms occurring in the cycloconverter of FIGS. 1 and 2 when it is supplying current to an inductive load, and FIG. 5 is a graphical representation of waveforms illustrating the operation of a reconstitution circuit which forms a part of the cycloconverter of FIGS. 1 and 2.

The graphs of FIGS. 3, 4, and 5 qualitatively represent typical plots of voltage against time but are not necessarily exact in every detail.

FIG. 1 shows a cycloconverter circuit connected to three input phase lines A, B and C of a three phase four wire alternating current supply. The cycloconverter includes 18 thyristors arranged in three groups. The phase line A is connected through a reconstitution circuit 1 to the cathode of a thyristor 2 and the anode of a thyristor 3 in the first group 4, to the cathode of a thyristor 6 and the anode of a thyristor 5 in the second group 9, and to the cathode of a thyristor 8 and the anode of a thyristor 7 in the third group 10. Similarly, the phase line B is connected through a reconstitution circuit 11 to the cathode of a thyristor 12 and the anode of a thyristor 13 in the first group 4, to the cathode of a thyristor 14 and the anode of a thyristor 15 in the second group 9, and to the cathode of a thyristor 16 and the anode of a thyristor 17 in the third group 10. The phase line C is likewise connected through a reconstitution circuit 18 to the cathode of a thyristor 19 and the anode of a thyristor 20 in the first group 4, to the cathode of a thyristor 21 and the anode of a thyristor 22 in the second group 9, and to the cathode of a thyristor 23 and the anode of a thyristor 24 in the third group 10. The cathodes of the thyristors 3, 13 and 20 and the anodes of the thyristors 2, 12 and 19 of the group 4 are connected together and connected via a low current detector 26 to an output phase line D which supplies a three phase load 25. A control output 27 from the low current detector 26 is connected to an input of a control circuit 28, which has six control outputs, one for each of the gate electrodes of the six thyristors on the group 4. The cathodes of the thyristors 5, 15 and 22 and the anodes of the thyristors 6, 14 and 21 of the group 9 are connected together and connected to an output phase line E which also supplies the load 25 via a second low current detector 29. The low current detector 29 has a control output 30 connected to a control input of a second control circuit 31, which also has six control outputs, in this case one for each gate electrode of the six thyristors of the group 9. Similarly the cathodes of the six thyristors 7, 17 and 24 and the anodes of the thyristors 8, 16 and 23 of the group 10 are connected to the third phase line F to supply the load 25 via a third low current detector 32. A control output 33 of the detector 32 is connected to a control input of a third control circuit 34, which has six control outputs, one for each of the gate electrodes of the thyristors of the group 10.

Supply voltage reference signal outputs of the reconstitution circuits 1, 11 and 18 are connected to inputs of the control circuits 28, 31 and 34. A signal generator circuit 35 is constructed to provide three square wave outputs which have the same frequency but differ in phase by increments of 120°, that is to say one-third of a period of the square wave.

FIG. 2 shows in greater detail those parts of the cycloconverter of FIG. 1 relevant to the first group of thyristors 4 which supply power to the output phase line D. It includes more detailed diagrams of the control circuit 28 and the reconstitution circuits 1, 11 and 18. For convenience the group of thyristors 4 is shown again in FIG. 2 together with a low current detector 26. A square wave signal $D^1$ from the generator 35 is connected to the input of an integrator 100. The output of the integrator 100 is connected to the input of a threshold circuit 101, to the input of an inverting amplifier 102 and to the period control inputs of three variable period monostable circuits 103, 104 and 105. The output of the inverting amplifier 102 is connected to the period control inputs of three other variable period monostable circuits 106, 107 and 108. The threshold circuit 101 may be a high gain comparator amplifier having one of its inputs connected to a reference voltage. It has complementary outputs, of which one is connected to an input of an AND-gate 109 and the other is connected to an input of an AND-gate 110. The second inputs of the AND-gates 109 and 110 are connected to the control signal output 27 of the low current detector 26. The outputs of the AND-gates 109 and 110 are connected respectively to the 1-setting and 0-setting inputs of a bistable switching circuit 111. One output of the bistable circuit 111 is connected to the input of a delay circuit 112 and to one input of and AND-gate 113. The output of the delay circuit 112 is connected to the second input of the AND-gate 113. The complementary output of the bistable circuit 111 is connected to the input of a second delay circuit 114 and to one input of an AND-gate 115. The output of the delay circuit 114 is connected to the second input of the AND-gate 115. The output of the AND-gate 113 is connected to inputs of three AND-gates 116, 117 and 118. The output of the AND-gate 115 is connected to inputs of three other AND-gates 119, 120 and 121.

The reconstitution circuits 1, 11 and 18 are similar and only the circuit 1 will be described in detail. Part of the phase voltage supply line A forms the primary winding 122 of a current transformer 123. The phase line A is also connected via the secondary winding 124 of the current transformer 123 to a signal output line 125. A variable resistor 126 and an inductor 127 in series are connected across the secondary winding 124. A capacitor 128 and a resistor 129 in series are connected between the output line 125 and earth. The output line 125 is connected to the input of a threshold detector 130. Corresponding outputs from the reconstitution circuits 11 and 18 are connected to the inputs of the threshold circuits 131 and 132 respectively. The threshold circuits 130, 131 and 132 have complementary outputs; their normal outputs are connected to the trigger inputs of the monostable circuits 103, 104 and 105 respectively, while their complementary (inverted) outputs are connected to the trigger inputs of the monostable circuits 106, 107 and 108 respectively.

For reasons of economy the threshold circuits on the control circuits 31 and 34 which correspond to the circuits 130, 131 and 132 in the control circuit 28 may be omitted and the control circuits 31 and 34 may be supplied from the outputs of the said threshold circuits 130, 131 and 132. Suitable connections are indicated by the references 133, 134 and 135, 136 and 137, 138 at the outputs of the threshold circuits 130, 131 and 132 respectively. The outputs of the variable monostable circuits 103, 106, 104, 107, 105 and 108 are connected to the switching inputs of a set of fixed period monostable circuits 139, 140, 141, 142, 143 and 144 respectively. The outputs of the monostable circuits 139 to 144 inclusive are connected to signal inputs of the AND-gate 116, 119, 117, 120, 118 and 121 respectively. The outputs of the AND-gates 116, 119, 117, 120, 118 and 121 are connected to the inputs of gate driver amplifiers 145, 146, 147, 148, 149 and 150 respectively. The outputs of the amplifiers 145, 146, 147, 148, 149 and 150 are connected to the gate electrodes of the thyristors 3, 2, 13, 12, 20 and 19 respectively of the group 4.

The control circuits 31 and 34 are identical in construction to the circuit 28 with the possible exception mentioned hereinabove that the threshold circuits 130 to 132 inclusive need not be duplicated in the circuit 31 and 34 if their monostable circuits are suitably connected to the outputs 133 to 138 inclusive. The low current detectors 26, 29 and 32 may be of the kind described in United Kingdom Pat. No. 1,195,581, wherein a reactor core is saturated when the current in a line is at or above a predetermined level, for example 10 milliamperes. The reactor core is provided with a winding which forms part of an oscillator circuit. The winding has a low impedance when the core is saturated and a high impedance otherwise, and the oscillator is arranged to produce an output only when the said winding is in its high impedance state, that is when the current in the line is below 10 milliamperes.

In operation the cycloconverter of FIGS. 1 and 2 is supplied with three phase alternating current power from the lines A, B and C. It is required to convert this power, as far as possible, into three phase power at a lower frequency (the frequency of the reference signals $D^1$, $E^1$ and $F^1$ provided by the circuit 35 of FIG. 1), by transmitting selected portions of the input supply waveforms through its controlled rectifiers so that their cumulative outputs will form the required sinusoidal outputs on the output lines D, E and F.

The operation of the cycloconverter will now be described with reference to the waveforms represented in FIGS. 3 and 4. FIG. 3 shows waveforms relevant to the formation of one positive half cycle of the output phase line D of the cycloconverter when it is supplying a resistive load, and FIG. 4 shows corresponding waveforms for the case when the cycloconverter is supplying a highly inductive load. Similar actions (not illustrated) will occur to form the output signals on the lines E and F.

In FIG. 3, the waveforms $a$ $b$ and $c$ represent three supply voltage reference signals as they appear at the signal outputs of the reconstitution circuits 1, 11 and 18 respectively, $d$ represents the datum signal which appears at the output of the integrator 100, $e$ and $f$ represent the complementary outputs of the threshold circuit 101, $g$ $h$ and $i$ represent the normal outputs of the threshold circuits 130, 131 and 132 respectively, $j$ $k$ and $l$ represent the outputs of the variable period monostable circuits 103, 104 and 105 respectively, $m$ $n$ and $o$ represent the outputs of the fixed period monostable circuits 139, 141 and 143 respectively, $p$ represents the output developed on the output line D of the cycloconverter, $q$ represents the pulsed output of the low current detector 26, $r$ and $s$ represent the outputs of the AND-gates 109 and 110 respectively, $t$ and $u$ represent the complementary outputs of the bistable circuit 111 which are applied to the delay units 112 and 114 respectively, and $v$ and $w$ represent the outputs of the AND-gates 113 and 115 respectively.

Since the voltage drop across a conducting thyristor will generally be negligible, the conduction of a thyristor can be regarded as raising its output line voltage to follow a portion of its supply voltage waveforms. The thyristors connecting a given output line to different phase lines of the input power supply should be fired in sequence, at appropriate times so that the portions of the supply voltage waveforms followed will together form the best available approximation to the desired output voltage waveform. The action of the cycloconvertor herein described produces output voltage waveforms similar to, and in phase with, the datum signal waveforms. For efficient conversion and a desirably low harmonic content in the output, portions from each phase of the supply must be used consecutively.

The development of the desired alternating output voltages across a load naturally involves the transmission of alternating currents. Since thyristors are unilaterally conductive devices, the positive half cycles of the load current can only be supplied through positively connected thyristors and the negative half cycles of the load current can only be supplied through the negatively connected thyristors. It follows that in a cycloconverter having a three phase input, there should be three positively connected thyristors and three negatively-connected thyristors for each output phase line. For instance, in the present cycloconverter there are three positively connected thyristors 3, 13 and 20 and three negatively connected thyristors 2, 12, and 19 connected to supply the output phase line D from the supply phase lines A, B and C respectively. Similar sets of thyristors are provided to feed the output lines E and F, but it will suffice to describe the operation of the circuits supplying the line D.

The thyristors of the positively connected set must be triggered in sequence during periods coincident with the load current positive half cycles, whereas the thyristors of the negatively connected set must be triggered in sequence during the alternate periods coincident with the load current negative half cycles. The switching from one set to the other must be controlled by the datum signal to provide the desired output frequency, but it must be in phase with the output current rather than the output voltage or the datum signal. The phase relationship of the load current to the output voltage will depend on the power factor of the load.

The circuits for controlling the alternation from one set of thyristors to the other will now be described. The output of the integrator amplifier 100 provides the serasoidal datum signal $d$. The threshold circuit 101 produces complementary square wave outputs $e$ and $f$, which are reversed whenever the datum signal crosses its mean level. The low current detector 26 produces pulses (at a repetition rate of about 100 kHz), whenever the instantaneous value of the load current in the output line D is less than 10 milliamperes. In operation with a purely resistive load, these pulses are only produced when the output voltage waveform $p$ is approximately at its mean level; they are shown by waveform $q$. When the datum signal $d$ is in its positive half cycle the output $e$ makes the gate 109 transmit these pulses, while the output $f$ makes the gate 110 obstruct them. The first pulse transmitted through the gate 109 will switch the bistable circuit 111 to its 1-state, causing it to apply a positive voltage to the delay circuit 112 and the gate 113. After a short delay the output of the delay circuit 112 also becomes positive, causing the gate circuit 113 to apply a positive voltage to the gates 116, 117 and 118, as shown at $v$ in FIG. 3.

Conversely, when the datum signal reaches its negative half cycle the outputs $e$ and $f$ are reversed, the next pulse from the low current detector 26 switches the bistable circuit 111 to its 0-state, and after a short delay determined by the delay circuit 114, a positive voltage is applied to the gate circuits 119, 120 and 121. (The previously provided voltage applied to the gate circuits 116, 117 and 118 is removed when the bistable circuit 111 is reset to its 0-state).

Thus, the sets of gates 116-118 and 119-121 are made conductive alternately, being switched at the frequency of the datum signal, but in each half cycle the switching is delayed until the instantaneous load current has fallen below 10 milliamperes (that is, approximately the holding current of a thyristor), and the switching-on actions are further delayed by the period of the delay circuits 112 and 114. The signals for the positively connected thyristors pass through the gates 116-118 whereas the triggering signals for the negatively connected thyristors pass through the gates 119-121. The amplifiers 145 to 150 amplify the outputs of the gates 116, 119, 117, 120, 118 and 121 to a suitable power level for triggering the thyristors.

Each thyristor conducts when it is triggered, and remains conductive until some external action reduces its anode-to-cathode current to less than its holding current. If this current falls below its holding current for more than a few milliseconds the thyristor becomes non-conductive until it is triggered again by another trigger signal. A typical value of holding current is about 10 millamperes. The predetermined delays provided by the circuits 112 and 114 should be sufficiently long to ensure that current in the last rectifier triggered during the preceding load current half cycle has been reduced below its holding current before the first oppositely connected rectifier is triggered. This requires delay times greater than one-sixth of a period of the supply voltage waveform. The delay circuits 112 and 114 may be monostable circuits with inverter stages connected to their outputs.

The amount of power conveyed as a result of a single triggering will depend on how late in the supply voltage half cycle the triggering pulse is applied. The relative timing of the trigger signals is varied in accordance with the voltage of the serasoidal datum signal, as will now be described, to give the desired sinusoidal form of output.

Supply voltage reference signals comparatively free from transient effects are supplied by the reconstitution circuits 1, 11 and 18 respectively to the threshold circuits 130, 131 and 132 of FIG. 2. These threshold circuits produce complementary square wave outputs which are synchronized with the supply voltage waveforms. The graphs at g h and i in FIG. 3 show the normal outputs from the threshold circuits 130, 131 and 132 respectively. The variable period monostable circuit 103 is triggered by the normal output g from the threshold circuit 130, at the beginning of every positive half cycle of the input supply on line A. Its unstable state lasts for a time controllable by the voltage of the serasoidal datum signal provided by the integrator amplifier 100. When the variable period monostable circuit 103 resets itself, it triggers the fixed period monostable circuit 139. The output of the monostable circuit 139 provides a trigger signal for triggering the rectifier 3, which however is only connected to the rectifier 3 when the gate circuit 116 is conductive.

The variable period monostable circuits 104 and 105 are similarly arranged to be triggered by the outputs of the threshold circuits 131 and 132, at the beginning of each positive half cycle of the input supply waveforms on the lines B and C respectively. The variable period monostable circuits 106, 107 and 108 are similarly connected to the complementary outputs of the threshold circuits. The fixed period monostable circuits 139 to 144 inclusive are arranged to be triggered by the negative-going trailing edges of the outputs of the variable period monostable circuits 103, 106, 104, 107, 105 and 108 respectively.

Each of the variable period monostable circuits 103 to 108 is constructed so that the duration of its unstable state is inversely related to the voltage applied to its period control input, and has a duration approximately equal to one-third of a period of the input supply waveform when its period control input voltage is at the mean voltage level of the datum signal. The circuits 106, 107 and 108 are controlled by an inverted form of the datum signal. The circuits 139, 141 and 143 product trigger signals in every positive half cycle of the associated input supply voltage waveforms, whereas the circuits 140, 142 and 144 product trigger signals in every negative half cycle of the associated supply waveforms. The timing of the trigger signals within these half cycles is varied according to the datum signal voltage.

When one of the variable period circuits happens to be triggered at the beginning of a half cycle of the datum signal, it produces a delay of about one-third of a period, that is to say 120° phase angle, of the input supply waveform so that the thyristor receiving the resulting pulse will start conducting only 60°, that is to say one-sixth of the period of the supply voltage waveform, before its supply voltage crosses its mean level. A variable period circuit triggered when the datum signal has a higher instantaneous voltage will produce a lesser delay, so that the thyristor receiving the resulting firing pulse will be fired earlier with respect to its input supply waveform, and will be able to conduct for a longer time. A variable period circuit which is triggered at the peak of the datum signal will produce a minimum delay of about 30° phase angle or one-twelfth of a period of the input supply waveform, thereby allowing the associated thyristor to be conductive over 120° phase angle before its supply voltage corsses its mean level. The times of triggering of the variable period circuits depend on the input supply waveforms, and since the input supply waveforms have a frequency higher than the frequency of the datum signal their phase relationships with the datum signals tend to vary. Hence there is no specific relationship between the times of occurrence of the thyristor current pulses and the phases of the associated datum signal. However the described arrangement does ensure that the current pulses occurring concurrently with the crests of the associated datum signal waveform last longer than the current pulses occurring when the datum signal is near its mean level.

The waveform drawn as a continuous line at p in FIG. 3 shows the cumulative effect of the thyristor current pulses applied to the output line D, for the comparatively simple case in which the load (25 on FIG. 1) is wholly resistive and is star-connected with an earthed neutral point. In this case, the load current will be in phase with the output voltage, the low current detectors will produce pulses at the beginning of the datum signal half cycles, the bistable circuit 111 will be switched substantially in phase with the datum signal, and the thyristors will generally cease conducting when their input supply voltages cross the voltage of the neutral point, that is to say earth potential. Near the peaks of the datum signal waveform, some of the thyristors will be made to cease conduction by the triggering of an adjacent thyristor which is connected to the same output line but receives its power from a different supply line with a higher instantaneous voltage. After smoothing the output waveform will be approximately sinusoidal, as indicated by the broken curve superimposed on the graph at p in FIG. 3. The smoothed output current will tend to copy the waveform of the datum signal but will be appreciably more sinusoidal in shape. It will probably have an appreciable jitter, or variable phase delay, with respect to the datum signal but in most applications, this will be unimportant.

The action of the cycloconverter when supplying an inductive load is more complex, as the load current lags the output voltage, and inductive voltages developed across the load allow the thyristors to continue conducting for some time after their supply voltages cross the potential of the neutral point. Waveforms typical of the converter operation with a highly inductive load are qualitatively shown in FIG. 4, in which curves a b and c represent the supply voltage waveforms, curve d represents the datum signal provided by the output of the integrator 100, curve p represents the output voltage on the line D (without smoothing), graph x represents the load current in the output line D, graph q represents the output of the low current detector 26, and graphs v and w represent the outputs of the gates 113 and 115 respectively. The negatively connected thyristors are triggered in sequence during the negative half cycle of the load current, with the results shown on the left-hand side of FIG. 4. Just left of the center of FIG. 4, the load current becomes less than 10 milliamperes, and the first pulse from the low current detector 26 switches the bistable circuit 111 (FIG. 2). This cancels the output w of the gate 115, thereby stopping the application of trigger signals to the negatively connected thyristors. A guard period, due to the delay circuit 112, follows before the output of the gate circuit 113 (shown at v in FIG. 4) rises to allow the gates 116, 117 and 118 to pass trigger signals to the positively connected thyristors. The positively connected thyristors are then triggered in sequence during the load current positive half cycle. It should be noted that the output voltage (solid curve at p) is made to follow sections of the three input supply voltage waveforms taken in sequence. It should also be noted that the control of the triggering signal delays in accordance with the datum signal makes the mean level of the output voltage waveform (indicated by the broken curve at p in FIG. 4) approximately following the datum signal waveform d. In general, some smoothing will be provided by the load, or by conventional smoothing circuits (not shown) so that the broken curve at p may be considered a typical useful output from the cycloconverter.

As hereinbefore mentioned, the thyristor firing actions generally generate undesirable transient effects on the input supply voltage waveforms, typically as illustrated by the continuous curve at a in FIG. 5, wherein the dashed line indicates the ideal, undistorted sinusoidal form of the input supply voltage waveform. Since a transient formed on any phase line is liable to effect the other phase lines as well through inductive coupling, each supply voltage waveform is liable to be affected by one such transient for every thyristor in the converter in every cycle of the input supply waveform. (Such transients may appreciably affect the output waveforms, but to avoid unnecessary complications no attempt was made to show any effects of induced transients in FIGS. 3 and 4).

It is necessary, or at least very desirable, that such transients should not be transmitted to the thyristor firing circuits, and hence the reconstitution circuits 1, 11 and 18 are provided to derive comparatively transient-free versions of the supply voltage waveforms for use in the control circuits hereinbefore described. Each reconstitution circuit operates by deriving pulses approximately proportional to the effect of the transients on its supply voltage waveform and forming a combination of these pulses plus the supply voltage waveform, as will now be described.

Each current pulse drawn through the supply line A by the conduction of one of the thyristors 2, and 3 in FIG. 2, and each current pulse drawn through the line A due to inductive coupling between the lines A, B and C which arises nearer to the converter system than the reconstitution circuits, will pass through the primary winding 122 of the transformer 123 and will induce a corresponding voltage in the secondary winding 124 as indicated at b in FIG. 5. Since one end of the winding 123 is connected to the supply line A, its other end develops a voltage which varies substantially as a summation of the solid curve waveforms of a and b in FIG. 5, and this approximates to the ideal waveform shown by the broken curve at a. The current transformer 123, made according to conventional techniques, should be effective over a restricted range of frequencies including the supply frequency. To ensure a sufficient compensating action over the frequency range of the transient effects, some frequency compensation is provided by connecting a frequency-dependent load, in the form of the resistance 126 and inductance 127, across the secondary winding 123. The resistance 126 is adjusted to achieve a suitable response to the lower frequencies involved. The inductance 127 is designed to operate at high frequencies, so as to compensate for the high frequency spikes which generally occur at the beginning of each transient. The composite or reconstituted voltage waveform appearing on the line 125 requires very little additional smoothing to provide a suitable reference waveform for the threshold circuit; a simple filter comprising the capacitor 128 and resistor 129 is sufficient. The reconstitution circuits 11 and 18 operate in similar fashion to the circuit 1 described hereinabove.

It should be realized that the described embodiment has been described by way of example only, and many variations thereof will be obvious to those skilled in the art. For example, a cycloconverter may be constructed to derive a variable frequency output from a fixed frequency input. The invention is not confined to three phase power systems; other embodiments could easily be made to transfer power from a single-phase input or from any given alternating current supply to form any number of outputs, eg to form a two phase output from a three phase input or vice versa. The datum signal waveform may be sinusoidal instead of triangular or serasoidal.

I claim:

1. A cycloconverter for transforming electrical power from an alternating current supply of a given frequency to another frequency comprising:
   input reference means for deriving at least one supply voltage reference output representative of a waveform of the said alternating current supply,
   datum signal supply means for providing at least one periodic datum signal having the said other frequency,
   a plurality of variable period timing circuits each having a triggering input connection connected to an output of the said input reference means, and a period-controlling input connection connected to an output of the said datum signal supply means,
   a plurality of trigger circuit means, each connected to respond to resetting actions of a separate one of the variable period timing circuits, for generating trigger signals for each resetting action thereof, and
   a plurality of controllable rectifiers each connected to receive trigger signals from a separate one of the trigger circuits and to transmit power from the said alternating current supply when rendered conductive by the said trigger signals.

2. A cycloconverter as claimed in claim 1, comprising a common output line, a low current detector circuit coupled to the common output line so as to provide an output whenever the instantaneous current therein is less than a predetermined magnitude, and a gating circuit means; wherein the controllable rectifiers comprise at least one rectifier which is negatively connected, that is to say having its anode connected to the common output line, and the gating circuit means comprises:
   a bistable circuit;
   setting means, responsive to the datum signal output and the low current detector output, for setting the bistable circuit to a first state whenever the datum signal output is in a positive-going half cycle and the instantaneous magnitude of the output line current becomes less than a predetermined magnitude;
   resetting means, responsive to the datum signal output and the low current detector output, for resetting the bistable circuit to a second state whenever the datum signal output is in a negative-going half cycle and the instantaneous magnitude of the output line current becomes less than the predetermined magnitude,
   and gate circuits controlled by the bistable circuit and connected to the trigger circuits to prevent the negatively connected rectifiers being triggered when the bistable circuit is in its first state and to prevent the positively connected rectifiers being triggered when the bistable circuit is in its second state.

3. A cycloconverter as claimed in claim 1, wherein the datum signal supply means is constructed to provide a plurality of datum signal outputs having a common frequency and predetermined phase relationships, and the said timing circuits, trigger circuit means and controllable rectifiers comprise a corresponding plurality of sets of circuits, connected so that each one of the datum signal outputs will control the timing circuits in a separate one of said sets; and including a plurality of output lines comprising a separate output line for each of the said sets of circuits, connected to receive the outputs of all the rectifiers in its set.

4. A cycloconverter as claimed in claim 3, including a plurality of low current detectors each coupled to a separate one of the output lines, and a plurality of gating circuit means, each responsive to one of the datum signal outputs and one of the low current detectors and connected to the trigger circuit means of the associated set so as to prevent the application of trigger signals to subset of the controlled rectifiers when the instantaneous current flowing in the output line supplied by them is less then a predetermined value, or of the opposite polarity to the current which they are connected to conduct.

5. A cycloconverter as claimed in claim 4, wherein each of the said gating circuits comprises:
   a bistable circuit;

setting means, responsive to the datum signal output and the low current detector output, for setting the bistable circuit to a first state whenever the datum signal output is in a positive-going half cycle and the instantaneous magnitude of the output line current becomes less than a predetermined magnitude;

and gate circuits controlled by the bistable circuit and connected to the trigger circuits to prevent the rectifiers connected with one polarity being triggered when the bistable circuit is in its first state and to prevent the rectifiers connected with the opposite polarity being triggered when the bistable circuit is in its second state.

6. A cycloconverter as claimed in claim 1 wherein the said input reference means comprises a separate reconstitution circuit for each phase of the alternating current supply, and each reconstitution circuit comprises a transformer constructed to be comparatively sensitive to transients having periods considerably shorter than a half cycle of the supply frequency, having a primary winding connected in series with a supply line of the cycloconverter and a secondary winding connected to derive a supply voltage reference output by an additive combination of the supply voltage with transient voltages induced in the secondary winding.

7. A cycloconverter as claimed in claim 1 and wherein the datum signal supply means is constructed to produce serasoidal signals of adjustable frequency.

* * * * *